Patented Sept. 17, 1940

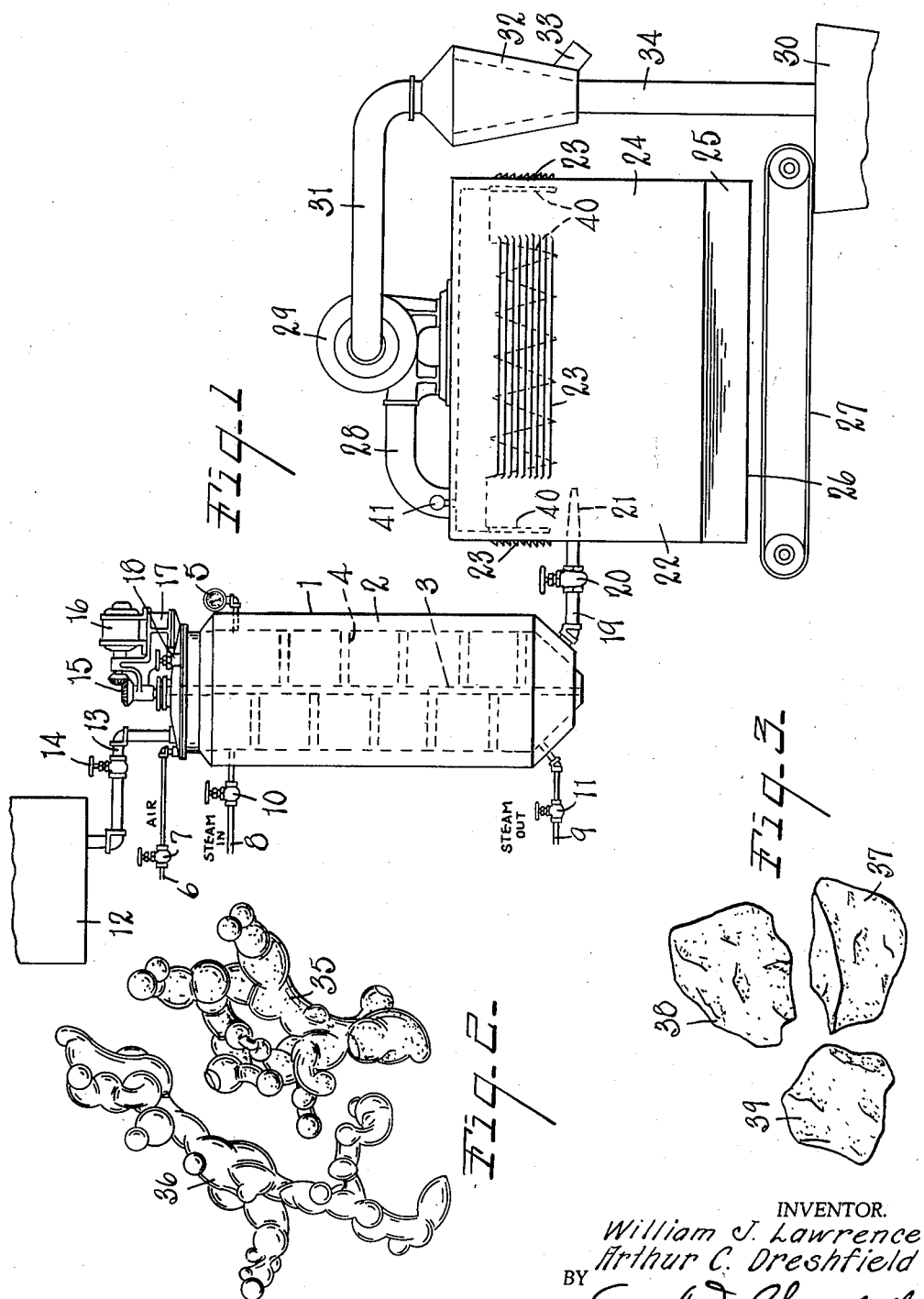

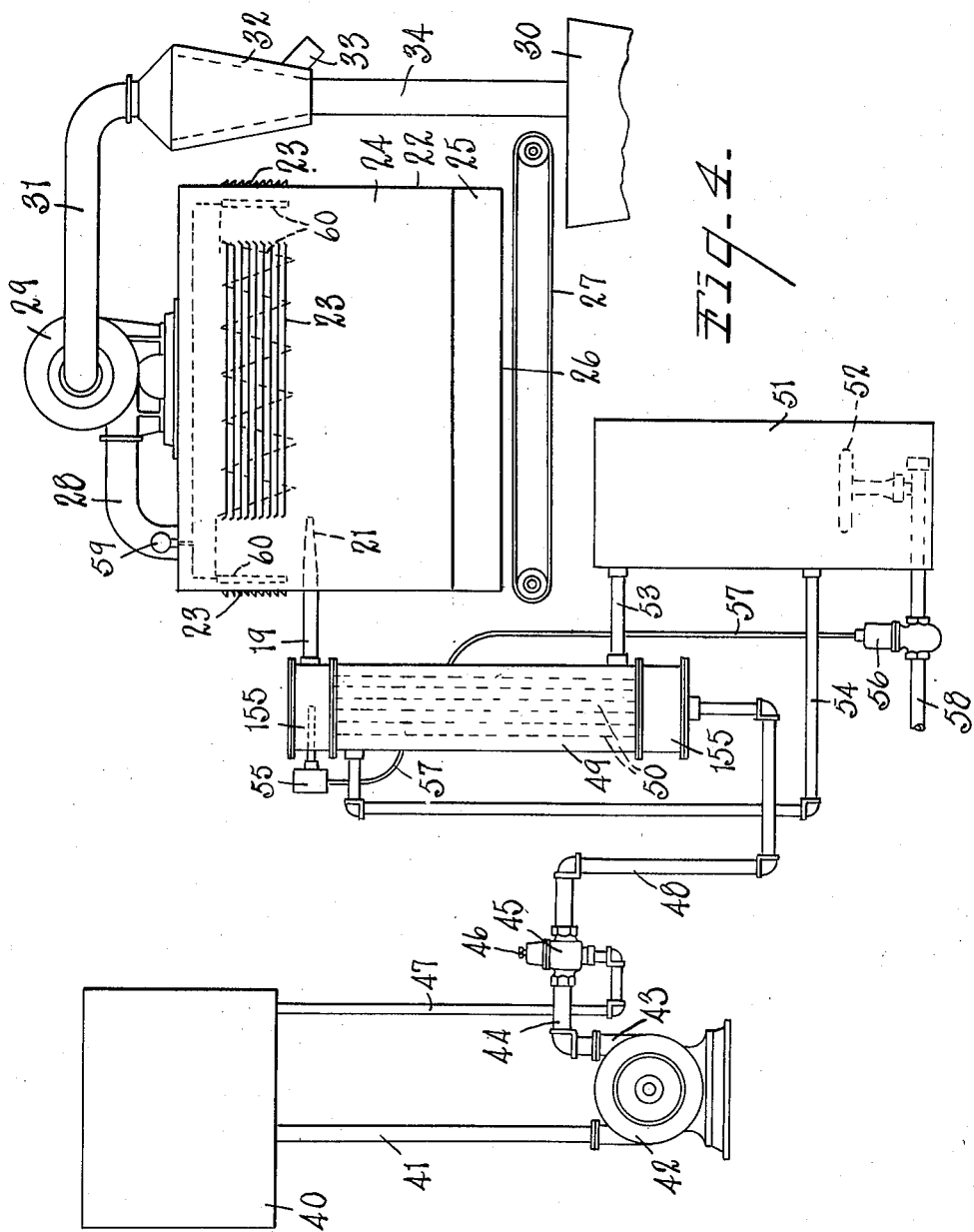

2,215,183

UNITED STATES PATENT OFFICE 2,215,183

APPARATUS FOR PRODUCING AMORPHOUS FORMS OF NORMALLY CRYSTALLINE SALTS

William J. Lawrence and Arthur C. Dreshfield, Kalamazoo, Mich., assignors to Hercules Powder Company, Wilmington, Del.

Application December 16, 1936, Serial No. 116,183

4 Claims. (Cl. 23—273)

This invention relates to improvements in apparatus for producing amorphous forms of normally crystalline salts.

This is a continuation in part of our application, Serial No. 603,123, filed April 4, 1932, and entitled Alum and method of producing.

The main objects of the invention are:

First, to provide an improved method of cooling, minutely subdividing, desiccating, and solidifying certain salts, more particularly aluminum sulphate and other normally crystalline inorganic salts containing more than four molecules of water of crystallization and which will not decompose under operating conditions to be hereinafter described.

Second, to provide a process for manufacturing aluminum sulphate, which is extremely simple, very economical, and efficient, and which results in a superior product.

Third, to provide an improved process for reducing normally crystalline inorganic salts to a minutely subdivided form having an extremely large exposed area, and being perfectly soluble.

Fourth, to provide an improved method of making powdered aluminum sulphate having the above desirable characteristics.

Fifth, to provide an improved method of manufacturing powdered crystalline inorganic salts such as aluminum sulphate directly and economically from the raw material, such as a concentrated solution of crystalline inorganic salt.

Sixth, to provide a continuous process for producing an amorphous form of a normally crystalline salt, as pointed out above.

Seventh, to provide apparatus for carrying out the process in a continuous manner.

Objects relating to details and economies of the invention will appear from the description to follow. The invention is defined in the claims.

The invention as practiced in the production of aluminum sulphate is equally applicable to the production in an amorphous form of other normally inorganic salts such as double alums, i. e., double sulphates of aluminum and other metal, for example, potash, soda, and ammonium alums, chrome alum, iron alum, sal soda, Glauber's salts, trisodium phosphate, copperas, blue vitriol, borax, and Epsom salts. Each of these salts may be defined as a normally crystalline inorganic salt which will not decompose under operating conditions and which has at least five molecules of water of crystallization.

The term "amorphous" is used to define particles which fail to exhibit or present a geometrical symmetry of shape common to and characterizing crystals.

The basic principle of our process of producing amorphous forms of normally crystalline salts is to raise the temperature of a concentrated solution of the salt in an autoclave while maintaining a pressure in the autoclave sufficient to keep the solution from boiling, the temperature rise being such as to impart enough heat to the solution to evaporate all the free water and possibly some of the water of crystallization thereof when the solution is released from the autoclave pressure, as by a drop to atmospheric pressure through a nozzle. In the specification to follow, we will describe our method of cooling, minutely subdividing, desiccating, and solidifying aluminum sulphate in amorphous form. However, it should be understood that any of the normally crystalline inorganic salts, of which these noted above are illustrative, are susceptible of being transformed to amorphous form in the same manner.

In the present commercial methods of producing aluminum sulphate, which is referred to loosely in the paper making and tanning industries as "alum," the mineral bauxite is changed, by various chemical steps to aluminum sulphate by the process of "sulphating" with sulphuric acid. In one stage of the process the concentrated solution of the aluminum sulphate is passed to sedimentation tanks where solid impurities are settled out. From these tanks, the clear liquors are pumped to evaporators, where sufficient water is removed to concentrate the solution to a point where, when they are run onto a so-called slabbing floor and allowed to remain for a period of several hours, they cool and solidify. This solid block of aluminum sulphate is then attacked with pickaxes and broken up into lumps varying from two to three inches thick, and varying in size, length, and width from one to six inches. This crude slab aluminum sulphate is then run to a preliminary crusher. Coming from this preliminary crusher, the aluminum sulphate is in the form of lumps about the size of an egg. These egg-sized lumps are then further reduced in dimensions by a second final grinding. The aluminum sulphate leaving the last grinding mill passes to a set of classifying or grading screens.

These screens separate the final grindings into several different particle sizes, namely, a very fine dust, which may be further classified by air flotation, another classification or grading of the small particles into ones the size of a pinhead or larger, and third, lumps the size of walnuts. In addition, certain oversize particles are led back through conveying and elevating equipment to the final grinding mill to be reground. It is manifestly true that the alum, after leaving the evaporators, is subjected to a costly series of treatments, including slabbing, slab breaking, preliminary grinding, final grinding, and classification and screening. Besides the grinding operation being a costly one, there is a considerable time factor involved in the pouring, cooling, breaking, crushing, and screening operations.

By our new process, we produce a finely divided salt of amorphous and substantially uniform dimensions, with the elimination of all of the laborious procedures mentioned above in connection with the handling of the liquor after it leaves the evaporators.

A preferred structure for carrying out our invention is illustrated in the accompanying drawings, in which:

Fig. 1 illustrates an apparatus for carrying out our process of making amorphous forms of normally crystalline salts.

Fig. 2 is a micro-drawing illustrating our improved product, greatly magnified.

Fig. 3 is a micro-drawing of aluminum sulphate particles produced by the old process, greatly magnified.

Fig. 4 is a diagrammatic view illustrating structure for carrying out our process continuously.

Broadly considered, our process consists in placing a hot solution of a normally crystalline salt having a concentration such that it contains 10% to 15% more water than the finished product in an autoclave, heating the same while maintaining the pressure in the autoclave sufficient to keep the solution from boiling, the rise in temperature being such as to impart enough heat to the solution to evaporate all the free water, that is, the water in excess of water of crystallization, and possibly some of the water of crystallization thereof when the solution is released from the autoclave pressure to atmospheric pressure, as by passing through a nozzle. The 10% to 15% water referred to above is that quantity of water over and above such quantity of water as will supply the water of crystallization for the salt in question. For example, if it is desired to prepare aluminum sulphate with eighteen molecules of water of crystallization, "the 10% to 15% water" refers to 10% to 15% in excess of the equivalent of eighteen molecules of water to be combined with the aluminum sulphate. The temperatures and pressures required will vary according to the concentration of the solution, but assuming an aluminum sulphate solution having 10% free water, we have found that an autoclave temperature of 364° F. and a pressure of 145 pounds (gauge) are necessary to bring about complete vaporization of the free water and transformation of the salt into minutely subdivided amorphous form. The particular temperature is arrived at by multiplying the latent heat of vaporization of water by the percentage of water in the solution and dividing by the specific heat of the salt solution, or $$\frac{.10 \times 980}{.41} = 239 \text{ Fahrenheit degrees}$$

which the temperature must be elevated over its temperature at discharge from the nozzle. Since the solution should, and by actual measurement does, leave the nozzle at 125° F., the temperature in the autoclave must be 125 plus 239 degrees or 364° F. The corresponding pressure to keep a solution of this temperature from vaporizing is found to be 145 pounds (gauge).

The following chart illustrates temperatures and pressures requisite to produce the amorphous aluminum sulphate from solutions of varying concentration:

| Percentage free water to be evaporated | Temperature of solution in autoclave | Pressure in autoclave (gauge) |
|---|---|---|
| | °F. | Pounds |
| 25 | 605 | 1,600 |
| 15 | 450 | 425 |
| 10 | 364 | 145 |
| 5 | 254 | 16 |

The above figures apply to the production of amorphous aluminum sulphate. They likewise are approximate for production of amorphous forms of the other chemicals previously mentioned, the exact temperatures and pressures being readily arrived at by a similar computation in which the specific heats of the solution will be the only variable in the formula shown above for calculating the heat input in the case of aluminum sulphate. Of course, the specific heat of the salt solution is obtained by multiplying the specific heat of the salt by the percentage of the salt in the solution and adding thereto the product obtained by multiplying the specific heat of water, 1, with the percentage of water in the solution.

We have found that by our process it is also possible to flash off water of crystallization from the salts by providing a greater energy input into the autoclave which may be accomplished by raising the temperatures and pressures somewhat over those required for vaporizing free water. For instance, we have removed 6% water of crystallization at a temperature of 327° F. and pressure of 75 pounds (gauge).

Referring to the drawings, numeral 1 indicates an autoclave which is provided with a steam jacket 2 for heating the contents thereof and a vertical shaft 3 extending downwardly through the center and carrying paddles or vanes 4 for agitating and/or mixing the contents of the autoclave while subjecting said contents to heat and pressure therein. A pressure gauge 5 is provided for indicating the pressure within the autoclave, which pressure is adapted to be built up from a suitable source of supply of air (not shown) which is connected to the autoclave through the air pressure supply pipe 6 having a valve 7 and opening to the interior of the top of the autoclave. Heat is supplied to the steam jacket 2 through the steam inlet and outlet pipes 8 and 9, respectively, which are connected to a suitable source of steam supply (not shown). The pipes 8 and 9 are provided with control valves 10 and 11.

The concentrated solution supply tank 12 is connected to the interior of the autoclave near the top thereof by the pipe 13 which is provided with a suitable control valve 14. The upper end of the vertical shaft 3 is geared at 15 to the shaft of the electric motor 16 for rotation thereby, the motor being mounted on the bracket 17 at the top of the autoclave. The top of the autoclave is also provided with an air or vapor vent valve 18. The bottom of the autoclave is provided with a discharge conduit 19 having a control valve 20 and terminating in a discharge nozzle or orifice 21. The latter is disposed within the interior of the drier chamber 22, the walls of which are substantially heat insulated and provided with air inlet louvers 23, whereby the temperature and pressure within the drier are maintained substantially constant. The side walls 24 of the drier terminate in inwardly inclined lower ends 25 having a longitudinal opening 26 therebetween for delivering the product to the endless conveyor 27 disposed thereunder. At its top, the drier 22 is provided with a discharge conduit 28 having a blower 29, which maintains a reduced pressure within the drier and discharges to the chute 30 through the conduit 31, there being a dust separator 32 in said pipe 31 having an air discharge arm 33 and a product discharge arm 34. The pressure is reduced only by virtue of the fact that the blower is removing the air within the chamber at a high rate of speed, in order to remove from the chamber the vapor laden air. Any system which is being exhausted by a blower will be under a slight reduction in pressure and we do not intend to infer the reduction in pressure brought about by the application of a vacuum pump to a closed system.

It is important that the solution be discharged or sprayed into an atmosphere capable of absorbing the moisture liberated therefrom. Therefore, for the purpose of maintaining the relative humidity of the atmosphere inside the drier at a predetermined point, we place a humidostat 41 in the conduit 28, preferably adjacent the point of connection of the conduit with the drying chamber. The humidostat is adapted to respond to the relative humidity of the air leaving the chamber and is adapted to control the temperature of the air entering the chamber through the louvers 23 by control of the heating element 40 placed adjacent the same. It is imperative in our process that the moisture content of the air within the drier be maintained low enough so that the moisture to be evaporated from the aluminum sulphate solution may be properly dissipated. The heater referred to in connection with the humidostat is only for the purpose of heating the air to this extent. For all material purposes, i. e., so far as the solution is affected, the air within the drier 22 is at a substantially atmospheric temperature and pressure condition. The actual temperature of the air in the drier is usually not in excess of 90° F. to 100° F. Heating thereof (when it occurs) is distinctly for the sole purpose of decreasing relative humidity to facilitate evaporation of the free moisture. Any other suitable air conditioning or dehydrating means may be employed, but we find the apparatus as illustrated to be satisfactory.

Simple calculations will furnish the volume or air required to absorb the moisture liberated during the spraying operation. For example, in the case of a solution from which it is desired to evaporate 10% free water, and assuming a humidity of 60% relative humidity, 1500 feet per minute are required. The humidostat and blower may accordingly be set to maintain these conditions.

The hot concentrated solution of aluminum sulphate is first charged to the autoclave 1 by opening the control valve 14. Since in the discharge of the solution from the autoclave a certain amount of desiccation takes place, it is therefore unnecessary to concentrate the solution to the same degree that such solutions have been concentrated heretofore in the prior common methods of productions to obtain solidification and slabbing action. The valve 14 is then closed and heat and pressure are applied to the contents of the autoclave by manipulating the control valves 7, 10 and 11. The solution is heated under pressure in the autoclave until it reaches a temperature at which, at the pressure in the drier chamber 22 which is substantially atmospheric, substantially all of the free water and possibly some of the water of crystallization would flash off, the pressure in the autoclave being kept at a point to restrain vaporization of the solution during this heating. Thus, employing a solution of a concentration 80% to 85% of the concentration of the end product, we preferably heat the contents of the autoclave to a temperature of 302° F. to 392° F. at a gauge pressure of 125 to 175 pounds to bring about this condition. The bottom discharge valve 20 of the autoclave is then opened and the hot concentrated aluminum sulphate solution is discharged from the bottom of the autoclave through the discharge nozzle or orifice 21 in the form of a spray into normal unheated or slightly heated atmospheric air supplied through the louvers 23 to the interior of the drier chamber 22. In the resulting expansion, the concentrated aluminum sulphate solution is desiccated, cooled, and subdivided, yielding a fine powder of substantially uniform particle characteristics of hard solid amorphous aluminum sulphate. The particles designated by the reference numerals 35 and 36 in Fig. 2 are illustrative of the fine aluminum sulphate powder produced by our process in accordance with the foregoing example, the exact form, shape, etc., being controllable by controlling operating temperatures, pressures, nozzle design, etc. The same process is followed without variation in the treatment of double alums, trisodium phosphate, magnesium sulphate, borax, and the other salts as herein pointed out to produce hard solid amorphous forms thereof from solutions of different concentrations, the resultant particles having a branched oölitic structure similar to the particles illustrated in Fig. 2.

From the above description, it will be apparent to those skilled in the art that our process is not only novel, but is highly practical and more economical than prior methods of production. There are numerus advantages of our process and product, other than those of cost and speed of production. For example, the aluminum sulphate produced by our method is very readily soluble in water. This is due to the peculiar physical form in which the alum is produced. Instead of being compact, dense, smooth-sided granules such as shown at 37, 38, and 39, as illustrated by Fig. 3, a microscopic examination, as illustrated by Fig. 2, shows each particle 35, 36 to be in the form of a nucleus from which extend fingers or arms in all directions, made up of nodes, balls, or spheres, oölitic in form. This exposes a very large area for a given unit of weight, greatly facilitating the solubility of the material.

In addition, in such a form, this aluminium sulphate, when mixed with dry rosin size for use under our United States Patent No. 1,836,455, will not readily sedimentate by continued shaking. Since the regular crushed aluminum sulphate is smooth-sided and denser than dry size, there is a tendency in a mixture of the two for the aluminum sulphate to settle to the bottom when subjected to the jarring usual in commercial transportation. In the case of this salt the extended fingers or nodes interleave with dry size particles, and as a result of this, a mixture of these two does not show a tendency to separate, but remains uniform throughout. This is advantageous when used in sizing paper with the mixture.

The herein described method makes possible the production of a salt having distinctly less water of crystallization, i. e., one higher in anhydrous aluminum sulphate content than products heretofore marketed. For instance, normally aluminum sulphate contains a maximum of 17½% aluminum oxide and 38½% sulphur trioxide. By our process, we produce a salt having 20% $Al_2O_3$ and 44% $SO_3$. The reason for this difference in comparative percentages is explained by the difficulty experienced in evaporating water of crystallization in processes employing atmospheric evaporators, a difficulty which is not present in our process.

While our method is particularly applicable to the production of aluminum sulphate particles, we wish to cover the general method of subjecting to heat and pressure either concentrated sludges of insoluble materials or concentrated solutions of inorganic non-decomposable salts capable of existence in crystalline or amorphous form, discharging such solutions under pressure through nozzles or orifices into a substantially heat constant medium at substantially lower pressures, thus effecting a sudden expansion which results in the dessiccation, cooling, particle subdivision and solidification of the solid forming constituents of the concentrated solution or sludge. The method is applicable not only to ordinary aluminum sulphate, but also to those inorganic salts which normally crystallize with more than four molecules of water of crystallization some of which are arbitrarily listed below.

| Name of chemical | Formula |
| --- | --- |
| Double alums | $Na_2SO_4.Al_2(SO_4)_3.24H_2O$ |
|  | $K_2SO_4.Al_2(SO_4)_3.24H_2O$ |
|  | $(NH_4)_2SO_4.Al_2(SO_4)_3.24H_2O$ |
| Chrome alum | $Cr_2(SO_4)_3.K_2SO_4.24H_2O$ |
| Iron alum | $Fe_2(SO_4)_3.K_2SO_4.24H_2O$ |
| Aluminum sulphate | $Al_2(SO_4)_3.18H_2O$ |
| Sal soda | $Na_2CO_3.10H_2O$ |
| Glauber's salt | $Na_2SO_4.10H_2O$ |
| Trisodium phosphate | $Na_3PO_4.12H_2O$ |
| Copperas | $FeSO_4.7H_2O$ |
| Blue vitriol | $CuSO_4.5H_2O$ |
| Borax | $Na_2B_4O_7.10H_2O$ |
| Epsom salts | $MgSO_4.7H_2O$ |

We have established, for example, that amorphous forms of aluminum sulphate, magnesium sulphate, trisodium phosphate, and sodium borate may be produced according to the following chart of temperatures and pressures:

| Name of chemical | Temperature | Pressure (gauge) |
| --- | --- | --- |
| Aluminum sulphate: |  | *Pounds* |
| Example A | 169° C., 336° F | 140–145 |
| Example B | 160° C., 320° F | 140–145 |
| Example C | 181° C., 358° F | 150 |
| Magnesium sulphate | 190° C., 374° F | 150 |
| Trisodium phosphate | 189° C., 372° F | 150 |
| Sodium borate | 190° C., 374° F | 150 |

If the solution is delivered to the autoclave at certain excessively dilute concentrations, it may be necessary to vent off vapors and partially desiccate or concentrate the same by preliminary heating and venting off vapor in the autoclave. In such case, the autoclave constitutes in effect an evaporator to concentrate the solution as well as to impart the necessary conditions of temperature and pressure to the solution.

After the expansion, the subdivided particles are delivered to the endless conveyor 27 which discharges them into the chute 30. The very fine particles are carried with the air through the conduit 28 and are subsequently separated from the air by the separator 32 which delivers them through the discharge pipe 34 to the chute 30.

Our process lends itself admirably to the continuous as well as to the batch production of amorphous particles of the salts mentioned above and accordingly we have devised the structure illustrated in Fig. 4 for carrying out the process continuously. The reference numeral 40 indicates a tank containing a supply of the hot concentrated salt solution and supplying the solution through a conduit 41 to a high pressure pump 42. The pressure desired to be built up in the solution will determine the most suitable type of pump. We have conventionally illustrated a rotary type of pump. However, it will be understood that this is purely illustrative. We have achieved successful operation using a multi-cylinder reciprocating plunger pump. The pump discharges through the outlet 43 into a conduit 44 in which is placed a pressure regulating valve 45 adjustable by the screw 46. The valve is by-passed by the pipe 47 back to the supply tank whereby when the pressure exceeds a predetermined desired amount, as determined by the valve 45, the solution will be returned to the tank.

A conduit, generally indicated 48, carries the solution under pressure to the bottom of the heater generally designated by the reference numeral 49, where the solution which has been placed under proper pressure by the pump 42 is raised to the desired temperature so that on discharging through nozzle 21 complete vaporization of the free water and some of the water of crystallization is possible. The heater 49 contains a number of pipes shown in dotted lines and indicated by the reference numeral 50, around which we circulate hot oil for the purpose of heating the solution passing on the inside of the pipes, the solution having entered at the bottom of the heater 49 and exiting at the top thereof into the discharge conduit 19.

Assuming that it is desired to raise the temperature to 364°, which temperature was arrived at by calculations appearing above for a solution from which it is desired to evaporate 10% free water, and assuming that the temperature of the hot concentrated solution entering heater 49 is 264° F., it will be necessary to supply oil at a temperature of 564° F., if it is desired, for example, to properly heat the salt solution so that the process can be carried on to yield 20 pounds of salt per minute. To carry on the process at this rate, it is necessary to supply 30 pounds of oil per minute, or 4.65 gallons of oil per minute, at a temperature of 564° F. In order to take care of heat losses due to radiation, for such an output, we select an oil heating means capable of supplying five gallons of oil at 564° F. per minute.

In Fig. 4, the means for heating the oil used in raising the temperature of the solution is indicated diagrammatically by the reference numeral 51 and comprises a burner head shown in dotted lines at 52 adapted to raise to the desired temperature the oil supplied to the heater 49 through the pipe 53 and withdrawn therefrom through the pipe 54. A thermostat 55 inserted in the heater 49 at a suitable point in the header 155 and communicating with a control valve 56 through a tube 57 serves to govern the supply of combustion material to the head 52 through the pipe 58. In the example chosen for a solution having 10% free water, the thermostat 55 will be set so that when the temperature within the heater 49 falls below or rises above 564° F., control valve 56 will be actuated to increase or decrease temperature in the heater 51 for the heating oil by admitting more or less fuel to the head 52.

In other respects, the continuous process is identical with the process as performed to produce separate batches of the product by the structure illustrated in Fig. 1. Of course, it is apparent that regulation of the blower 29 in accordance with the different requirements of a constantly discharged spray of particles in the drier 22 will be necessary.

Our process as performed continuously is characterized by the remarkable accuracy with which the temperatures and pressures requisite thereto may be calculated in advance and the extent to which the practical requirements of the process correspond to those arrived at empirically.

The product of the method and apparatus hereinafter claimed is covered in our copending application, Serial No. 116,184, filed December 16, 1936, and entitled Chemical products.

We have illustrated and described our improvements in an embodiment which we have found very practical. We have not attempted to illustrate or describe other embodiments or adaptations as it is believed that this disclosure will enable those skilled in the art to embody or adapt our improvements as may be desired.

Having thus described our invention what we claim as new and desire to secure by Letters Patent is:

1. Apparatus for treating salts comprising a drying chamber having means associated therewith for continuously supplying a gaseous drying medium at substantially atmospheric conditions of temperature and pressure, a discharge nozzle adapted to discharge a solution of the salt in said chamber, said nozzle having a restricted opening whereby a substantially elevated pressure may be placed on the solution behind said opening, means for renewing said medium and controlling the humidity of the same adjacent said discharge means, means for continuously pumping a solution to said nozzle under a substantially elevated pressure sufficient to prevent boiling of the solution in the pumping means, means for automatically regulating the last named pressure, means for continuously supplying concentrated solution to said pumping means, means for heating the solution to a substantially elevated temperature sufficient to cause vaporization of the free water of the solution upon release of the solution through the nozzle into said medium, means for continuously supplying a heating fluid to said heating means, means for heating said fluid, means for supplying fuel to said fluid heating means, and means governed by the temperature of said fluid for automatically regulating the supply of fuel.

2. Apparatus for treating salts comprising a drying chamber containing a gaseous drying medium at substantially atmospheric conditions of temperature and pressure, a discharge nozzle adapted to discharge a solution of the salt in said chamber, said nozzle having a restricted opening whereby a substantially elevated pressure may be placed on the solution behind said opening, means for renewing said medium and controlling the humidity of the same adjacent said discharge means, means for continuously pumping a solution to said nozzle under a substantially elevated pressure sufficient to prevent boiling of the solution in the pumping means, means for automatically regulating the last named pressure, means for supplying concentrated solution to said pumping means, means for heating the solution to a substantially elevated temperature sufficient to cause vaporization of the free water of the solution upon release of the solution through the nozzle into said medium, means for supplying a heating fluid to said heating means, means for heating said fluid, means for supplying fuel to said fluid heating means, and means governed by the temperature of said fluid for automatically regulating the supply of fuel.

3. Apparatus for treating salts comprising a discharge nozzle adapted to discharge a solution of the salt into a gaseous medium at substantially atmospheric temperature and pressure, said nozzle having a restricted opening whereby a substantially elevated pressure may be placed on the solution behind said opening, means for renewing said medium and controlling the humidity of the same adjacent said discharge means, means for continuously pumping a solution to said nozzle under a substantially elevated pressure sufficient to prevent boiling of the solution in the pumping means, means for automatically regulating the last named pressure, means for supplying concentrated solution to said pumping means, means for heating the solution to a substantially elevated temperature sufficient to cause vaporization of the free water of the solution upon release of the solution through the nozzle into said medium, and means for automatically regulating the temperature of said solution.

4. Apparatus for treating salts, comprising means for discharging a solution of the salt into a gaseous medium at substantially atmospheric temperature and pressure, means for renewing said medium and controlling the humidity of the same adjacent said discharge means, means for continuously pumping a solution to said discharge means under a substantially elevated pressure sufficient to prevent boiling of the solution in the pumping means, and means for heating the solution to a substantially elevated temperature sufficient to cause vaporization of the free water of the solution upon release of the solution through the discharge means into said medium.

WILLIAM J. LAWRENCE.
ARTHUR C. DRESHFIELD.